(12) United States Patent
Golovashchenko

(10) Patent No.: US 10,907,957 B2
(45) Date of Patent: Feb. 2, 2021

(54) METHOD OF MEASURING LOCALIZED STRAINS IN SHEET METAL STAMPINGS

(71) Applicant: OAKLAND UNIVERSITY, Rochester, MI (US)

(72) Inventor: Sergey F. Golovashchenko, Beverly Hills, MI (US)

(73) Assignee: OAKLAND UNIVERSITY, Rochester, MI (US)

( * ) Notice: Subject to any disclaimer, the term of this patent is extended or adjusted under 35 U.S.C. 154(b) by 265 days.

(21) Appl. No.: 15/980,954

(22) Filed: May 16, 2018

(65) Prior Publication Data

US 2018/0335296 A1 Nov. 22, 2018

Related U.S. Application Data

(60) Provisional application No. 62/506,858, filed on May 16, 2017.

(51) Int. Cl.
| | | |
|---|---|---|
| *G01N 21/84* | (2006.01) | |
| *G01B 11/16* | (2006.01) | |
| *G06T 7/62* | (2017.01) | |
| *G06T 7/00* | (2017.01) | |

(52) U.S. Cl.
CPC ............ *G01B 11/167* (2013.01); *G06T 7/001* (2013.01); *G06T 7/62* (2017.01); *G06T 2207/20021* (2013.01); *G06T 2207/30136* (2013.01)

(58) Field of Classification Search
CPC ......... G01B 11/167; G06T 7/62; G06T 7/001; G06T 2207/20021; G06T 2207/30136
See application file for complete search history.

(56) References Cited

U.S. PATENT DOCUMENTS

| | | | | |
|---|---|---|---|---|
| 9,321,090 | B2* | 4/2016 | Xia | B21D 22/00 |
| 9,953,115 | B2* | 4/2018 | Sonobe | G06F 17/10 |
| 10,259,176 | B2* | 4/2019 | Deck | B29C 70/543 |
| 2006/0205307 | A1* | 9/2006 | Drouin | B32B 5/02 |
| | | | | 442/328 |
| 2009/0102863 | A1* | 4/2009 | Wei | G06K 7/14 |
| | | | | 345/644 |

(Continued)

OTHER PUBLICATIONS

D.W. Manthey et al., "Vision-Based Surface Strain Measurement System", JOM, 1995, vol. 47, No. 7, pp. 46-49.

(Continued)

*Primary Examiner* — Gregory M Desire
(74) *Attorney, Agent, or Firm* — Brooks Kushman P.C.

(57) ABSTRACT

A method for measuring localized stretching of a manufactured part or in a test sample of various materials to identify the fracture strain or strain distribution. The method begins by etching or printing a grid of a plurality of cells on a surface of a blank. Dots of paint are then applied to the surface of the blank that are measured in a pre-forming condition and identified as to the location of the dots relative to the grid. The blank is then formed into a formed part and the dots are measured in one or more cells in a post-forming condition. The size of the dots in the pre-forming condition is compared to the size of the dots in the post-forming condition to determine the extent of stretching in localized areas of the formed part. The method may be repeated for successive operations with different colored dots.

15 Claims, 3 Drawing Sheets

(56) References Cited

U.S. PATENT DOCUMENTS

2015/0231682 A1* 8/2015 Fujii .................. B21D 22/02
  72/352
2016/0161382 A1* 6/2016 Yonemura ............... G06F 30/20
  73/851
2018/0335296 A1* 11/2018 Golovashchenko ........................
  G01B 11/167

OTHER PUBLICATIONS

"Application Example: Sheet Metal Forming. Modern measuring tools in stamping applications for complex and simple parts", GOM Optical Measuring Techniques, 2009, pp. 1-5, GOM mbH, Braunschweig, Germany.

Constantin Chiriac, "A Study of the Plastic Deformation of Sheared Edges of Dual Phase 780 Steel", SAE Technical Papers, Apr. 2010, 2010-01-0441, pp. 1-12.

Daniel Bailey, "Using Digital Image Correlation to Measure Full Field Strain", Advanced Materials & Processes, Oct. 2014, pp. 23-24.

\* cited by examiner

METHOD OF MEASURING LOCALIZED STRAINS IN SHEET METAL STAMPINGS

REFERENCE TO RELATED APPLICATIONS

This application claims the benefit of U.S. provisional application Ser. No. 62/506,858 filed May 16, 2017, the disclosure of which is hereby incorporated in its entirety by reference herein.

TECHNICAL FIELD

This disclosure relates to a method of measuring localized stretching of a blank during a forming or trimming operation.

BACKGROUND

Parts are manufactured in a series of steps generally beginning with a flat blank that is drawn to a general shape, trimmed to remove excess material, punched to form openings, flanged and in some cases hemmed. The flat blank may be metal such as steel or aluminum or may be a composite material. During the manufacturing process the part may be stretched in localized areas where the part is drawn to shape, trimmed, stretched or otherwise processed. If a part is excessively stretched, splits or cracks may be formed that may be unacceptable in the final part.

Draw dies used in a sheet metal manufacturing process include a draw bead on the die and on a binder ring that are shaped to control the extent that a blank is stretched. The shape, number, size and location of draw beads are adjusted to control localized stretching. Lubricants may be changed or the application location or quantity may be controlled to modify stretching in local areas. The material properties of the blank may also be a factor in localized stretching.

In the initial design of manufacturing dies and during the life of a manufacturing line, quality control problems may arise due to splits or cracks being formed in a part. Tests have been developed to measure localized stretch or strains in a part. In one type of test a grid pattern of squares and/or circles may be etched or printed on the surface of the part prior to the drawing step that is measured after the drawing step or other steps to determine the amount of stretching in a local area, but this test is inaccurate and is difficult to use to measure stretching around holes. The inaccuracy is usually dictated by the quality of the edge, the size of the cells and the fact that only partial cells are available if the trimming/blanking/punching line has curved shape. The method may include analysis of the change in the shape of the grid to create a forming limit diagram. This method may be augmented with the use of a digital camera that reads the individual shape of each ellipse of the original circular etched or printed grid pattern.

Digital image correlation techniques have been developed to measure strains in local areas more accurately than the grid analysis method. Paint is spattered on one side of the blank. During testing of the sheet metal, a tool applies a force to one side of the blank while a video camera focused on the other side of the blank records the sheet metal deformation or strain. Industrial sheet metal stamping processes deform a blank between two dies; therefore, there is no effective way to capture a video image of the process. The digital image correlation process does not allow for measurement of the extent of and location of the areas having localized strains with high resolution along all of the perimeters of interest in closed dies.

This disclosure is directed to solving the above problems and other problems as summarized below.

SUMMARY

According to one aspect of this disclosure, a method is provided for measuring localized stretching of a manufactured part. The system may also be applied to samples of materials for research directed to testing material properties of various materials to identify the fracture strain or strain distribution. The method may begin by etching or printing a grid of a plurality of cells on a surface of a blank. Dots of paint are then applied to the surface of the blank that are measured in a pre-forming condition and identified as to the location of the dots relative to the grid. The blank is then formed into a formed part. The dots are measured in one or more cells in a post-forming condition. The size of the dots in the pre-forming condition is compared to the size of the dots in the post-forming condition to determine the extent of stretching in localized areas of the formed part.

According to other aspects of the method the step of forming the blank may include a drawing step and may further comprise applying a second set of dots of paint to the surface of the formed part that are a different color than the dots of paint applied to the surface of the blank. The second set of dots are measured in a pre-processing condition and identified as to the location of the second set of dots relative to the grid. A processing step is then performed on the formed part following the drawing step. The second set of dots may be measured in one or more cells in a post-processing condition. The change in the size of the second set of dots is then compared in the pre-processing condition to the size of the second set of dots in the post-processing condition to determine the extent of stretching in localized areas of the formed part that occurred during the processing step.

The step of performing a process may be a re-striking operation, a trimming operation, a piercing operation, a flanging operation or a hemming operation.

The step of applying the dots to the blank and the step of applying the second set of dots to the formed part may be performed by spraying the paint in a random pattern on the grid and the cells.

According to another aspect of this disclosure, a method is disclosed for measuring local strains in a sheet metal part. The method includes the steps of selecting a sheet metal blank having a grid etched or printed on a first side and marking the blank with a plurality of dots superimposed over the grid. The initial size and location of the dots is recorded relative to the grid and the blank is then drawn to form a drawn part. The post-drawing size of the dots is measured in a selected portion of the grid, and the initial size and the post-drawing size of the dots is analyzed to calculate the strains on the surface of the drawn part.

The method may further comprise applying a second set of dots to the surface of the drawn part that are a different color than the dots applied to the surface of the blank. The second set of dots is measured in a pre-process condition and the location of the second set of dots is identified relative to the grid. A further process is then performed on the drawn part, and the second set of dots is measured in a selected portion of the grid in a post-process condition. The change in the size of the second set of dots in the pre-process condition to the size of the second set of dots in the post-process condition is then compared to determine the extent of stretching in localized areas of the drawn part that occurred during the step of performing the further process.

The step of recording the size and location of the dots may be performed by photographing the blank and the step of measuring the initial size and location of the dots and the drawn size is performed by photographing the dots post-drawing. The step of comparing the change in the initial size of the dots in the to the size of the drawn dots may be performed by comparing the pixels of photographs of the initial size of the dots in the selected cell to the size of the drawn dots in the cell.

The samples tested may be prototype parts or may be research samples that may be dog bone shaped, rectangular, round, or any other shape required by a test to define the fracture or necking strain that may be used in subsequent finite element analysis.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
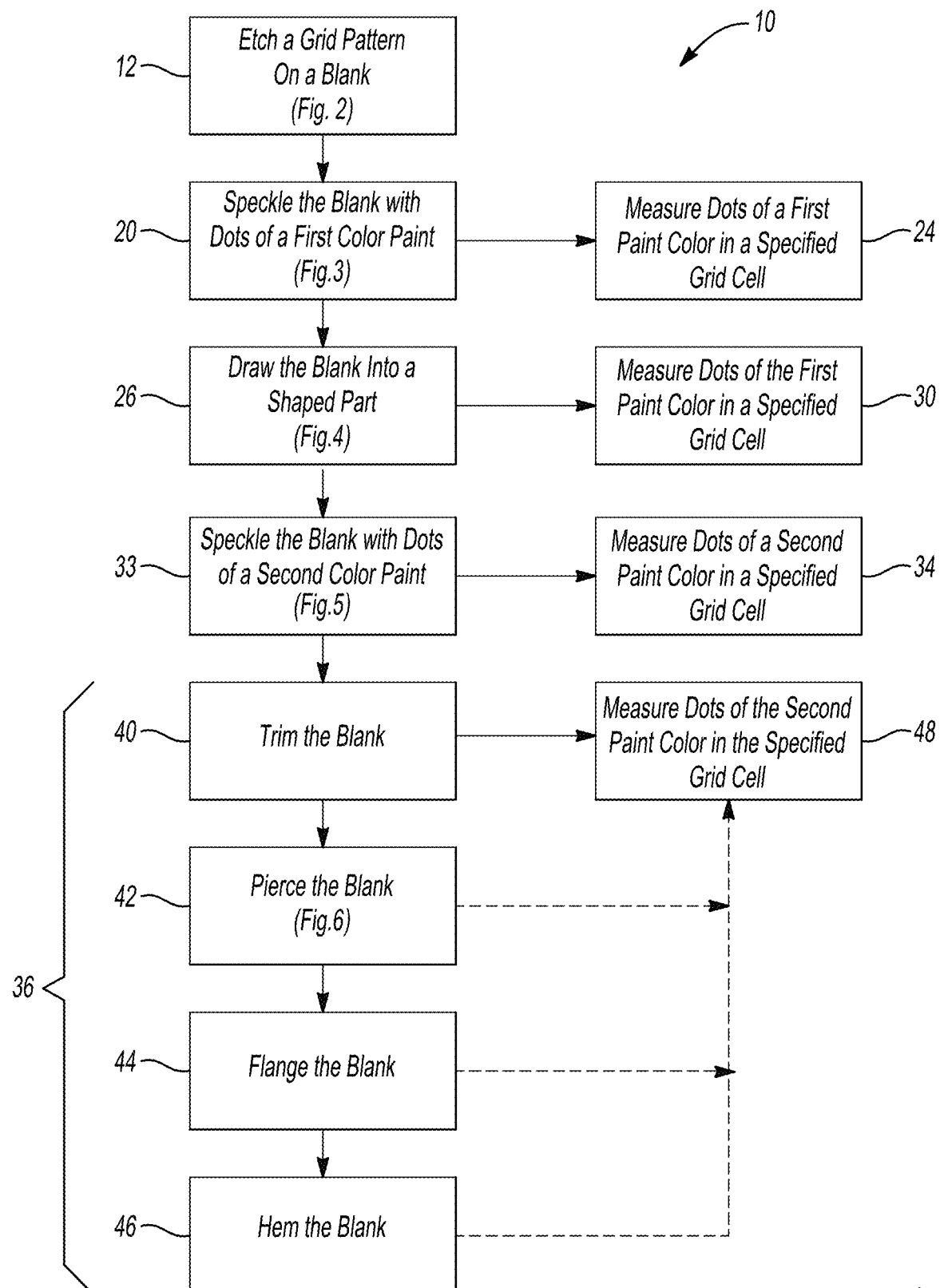
FIG. 1 is a flowchart illustrating one example of a method of analyzing stretching of a part during a manufacturing process according to this disclosure.
Figure 2:
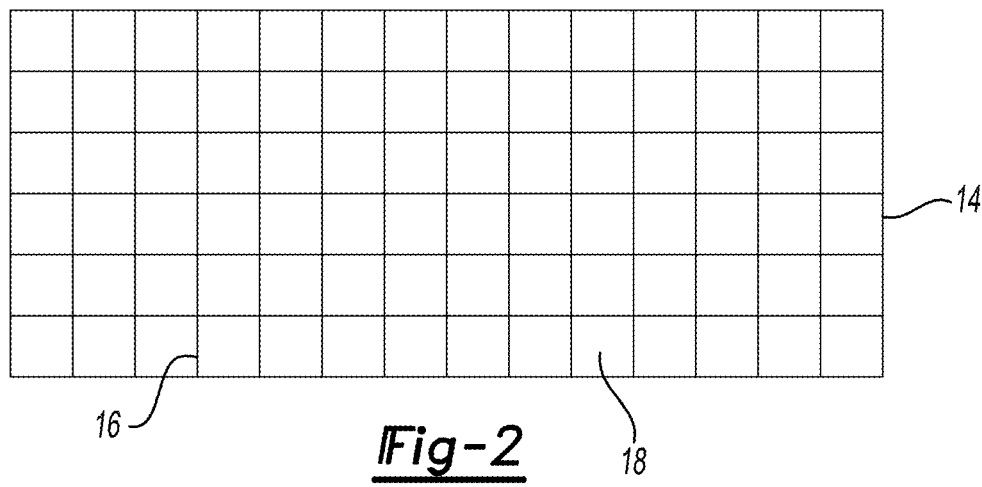
FIG. 2 illustrates a blank etched or printed with a grid pattern.

Referring to FIG. 1, one example of a manufacturing process is illustrated by the flowchart generally indicated by reference numeral 10. The process begins at 12 by etching or printing a blank 14 with a grid pattern 16 that defines a plurality of cells 18, as shown in FIG. 2. The blank 14 may be steel or aluminum, or another type of sheet metal or, alternatively, may be made of a composite material such as fiberglass, carbon fiber composite, sheet molding compound, an elastomer, or the like. The grid pattern 16 is etched in the metal surface but may be printed or otherwise marked on one or both the formed and the backup surfaces of the blank.

Figure 3:
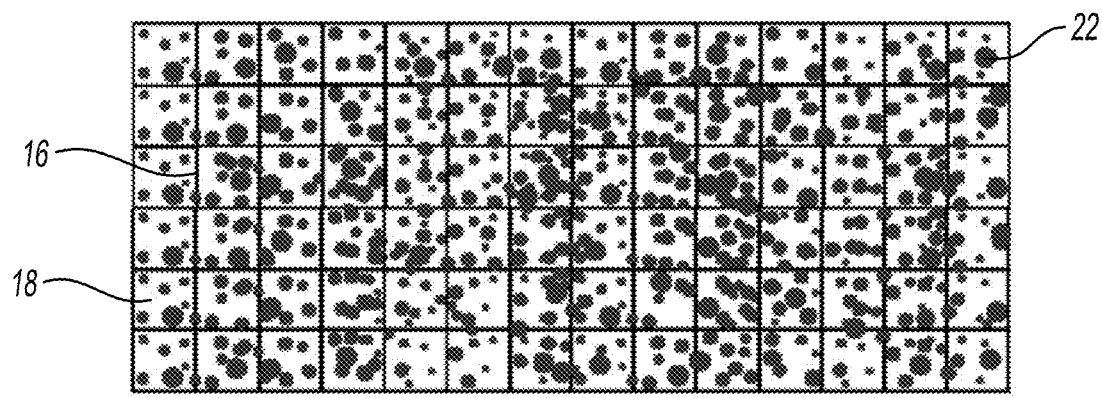
FIG. 3 illustrates a blank etched or printed with a grid pattern and speckled with paint dots of a first color.
Figure 6:
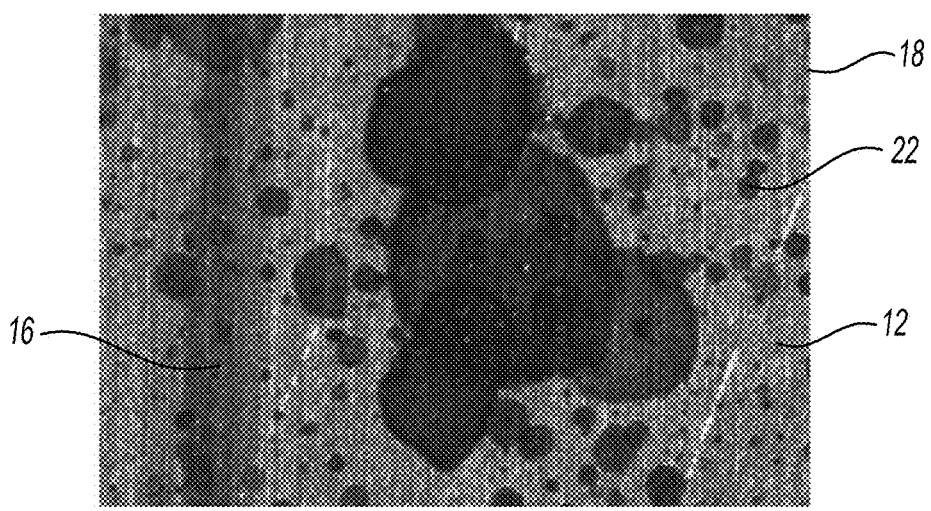
FIG. 6 is a photograph of paint dots applied to the surface of a blank.

The blank 12 is then spattered at 20 with paint of a first color to speckle the surface over the grid with dots 22 of paint, as shown in FIG. 3 and in the photograph of FIG. 6. The paint may be an oil based or latex paint or may be a stain or dye. Instead of paint, the dots may be applied by etching, printing, photo printing, or anther technique for marking the blank may be used. If the dots 22 are dots of paint, the paint must be dried. The dots 22 are measured and the location of the cells 18 containing the dots 22 is identified and recorded. The blank may be scanned or photographed with the fine dots being superimposed on the grid 16. The dots may be measured on a scan or photograph of the blank 12 or on the blank surface. The dots may be measured in any direction and the direction of the measurement is recorded for future reference.

Figure 4:
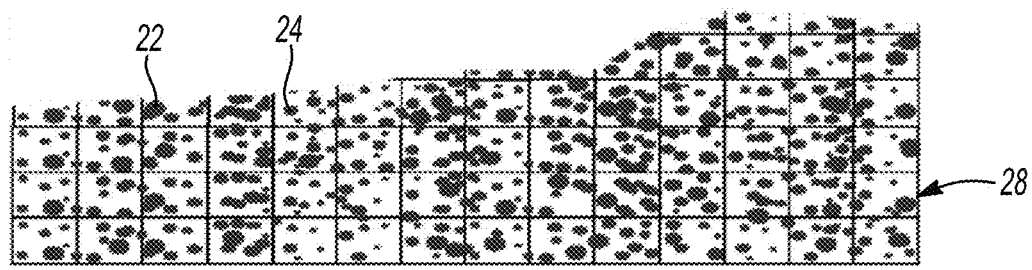
FIG. 4 illustrates a formed part having a complex contour etched or printed with a grid pattern and speckled with paint dots of a first color showing the dots stretched in a drawing step.
Figure 7:
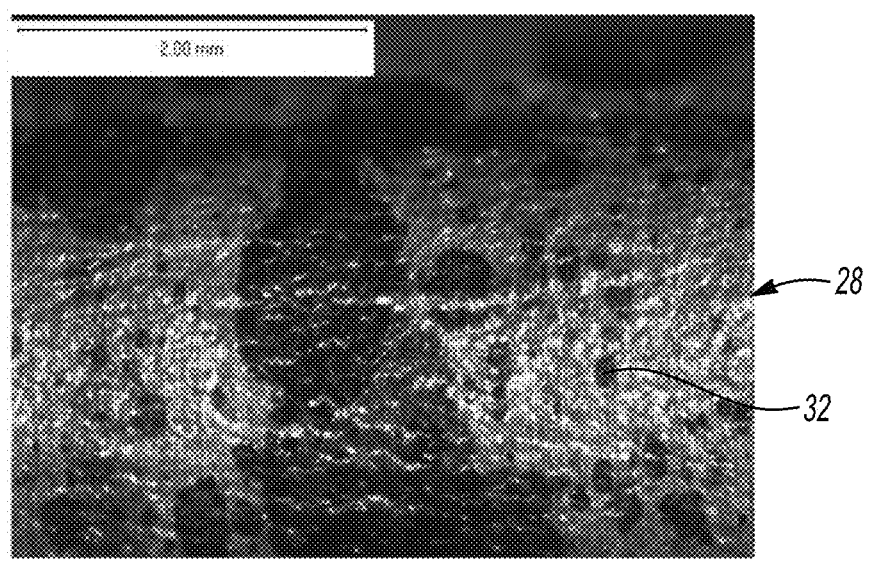
FIG. 7 is a photograph of paint dots applied to the surface of a formed part showing the dots stretched in a drawing step.

The blank 12 is then formed in a drawing operation at 26 into a formed part 28, as shown in FIG. 4. While in most manufacturing operations the first step is to draw the blank, in some cases the first step may be a different process step such as a blanking operation. During the drawing operation, the dots 22 are stretched with the blank 12. The dots 22 are then measured at 30 in the same direction as they were measured at 24. The dots may be measured on a scan or photographic image of the part as shown in the photograph of FIG. 7 or on the surface of the formed part 28. The measurements before and after forming are compared to determine the extent that the part was stretched in localized areas. If a digital photograph is taken, pixilation analysis techniques may be used to precisely measure dot deformation.

Figure 5:
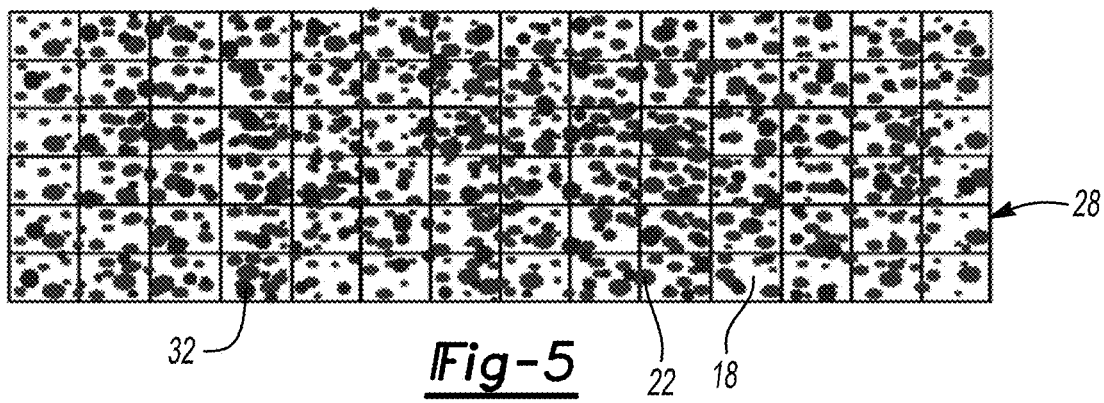
FIG. 5 illustrates a formed part showing dots stretched in a drawing operation that is speckled with paint dots of a second color.

The formed part 28 may then be removed from the manufacturing process and may be splattered with paint of a second color to speckle the surface over the grid with dots 32 of paint, as shown in FIG. 5. The paint dots 32 are dried, and then selected dots 32 are measured, and the cell 18 within which the dots 32 are located is identified and recorded at 34. The dots may be measured in any direction and the direction of the measurement is recorded for future reference. The dots 32 may be measured on a scan or photograph of the formed part 28 or on the surface of the formed part 28.

The blank 12 is then processed in a subsequent operation at 36 into a processed part 38. The subsequent operation may be any of the operations after the drawing operation 26 such as re-striking, trimming 40, piercing 42, flanging 44, or hemming 46. Generally, the subsequent operation is an operation in which a problem is being encountered with splits or cracks being formed on the part 28, generally around openings or holes or areas having an irregular perimeter. For example, the blank may be punched to form a window opening or may have an irregular perimeter, as shown in FIG. 4, that would include strains that are difficult to analyze with a regular grid pattern.

During the subsequent processing operation, and as shown in FIG. 7, the dots 32 are stretched on the formed part 28 in a closed sheet metal die set. The dots 32 are then measured at 48 in the same direction as they were measured at 34. The dots 32 may be measured on a scan or photograph of the part or on the surface of the formed part 28. In some instances, the dots 22 of the first color may also be measured to determine if additional stretching has occurred in those areas after the drawing operation in the subsequent processing operation. The measurements before and after forming are compared to determine the extent that the part was stretched in localized areas in the subsequent processing operation.

The flowchart 10 depicts the method with two instances of spackling with paint but the process of applying the dots in different colors and measuring the dots before and after other processing steps may be repeated more than two times to develop additional data.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A method of measuring localized stretching of a manufactured part comprising:
    marking a grid of a plurality of cells on a surface of a blank;
    applying dots of paint to the surface of the blank;
    measuring the dots in a pre-forming condition and identifying a location of the dots within a selected cell of to the grid;
    forming the blank into a formed part;
    measuring the dots in the selected cell of the grid in a post-forming condition; and
    comparing a size of the dots in the pre-forming condition to the size of the dots in the post-forming condition to determine an extent of stretching in the selected cell on the formed part.

2. The method of claim 1 wherein the step of applying the dots to the blank is performed by spraying the paint in a random pattern to the grid and the cells.

3. A method of measuring localized stretching of a manufactured part comprising:
    marking a grid of a plurality of cells on a surface of a blank;
    applying dots of paint to the surface of the blank;
    measuring the dots in a pre-forming condition and identifying a location of the dots relative to the grid;
    forming the blank into a formed part;
    measuring the dots in one or more cells in a post-forming condition; and
    comparing a size of the dots in the pre-forming condition to the size of the dots in the post-forming condition to determine an extent of stretching in the localized areas of the formed part;
    applying a second set of dots of paint to the surface of the formed part, wherein the second set of dots are a different color than the dots of paint applied to the surface of the blank;
    measuring the second set of dots in a pre-processing condition and identifying a location of the second set of dots relative to the grid;
    performing a processing step on the formed part following the drawing step;
    measuring the second set of dots in one or more cells in a post-processing condition; and
    comparing a change in a size of the second set of dots in the pre-processing condition to the size of the second set of dots in the post-processing condition to determine an extent of stretching in localized areas of the formed part that occurred during the processing step.

4. The method of claim 3 wherein the processing step is a trimming operation.

5. The method of claim 3 wherein the processing step is a piercing operation.

6. The method of claim 3 wherein the processing step is a flanging operation.

7. The method of claim 3 wherein the processing step is a hemming operation.

8. The method of claim 3 wherein the step of applying the dots to the blank and the step of applying the second set of dots to the formed part are performed by spraying the paint in a random pattern to the grid and the cells.

9. A method of measuring local strains in a sheet metal part comprising:
    selecting a sheet metal blank having a grid marked on a first side;
    marking the blank with a plurality of dots superimposed over the grid;
    recording an initial size and location of the dots relative to the at least one cell of the grid;
    drawing the blank into a drawn part;
    measuring a post-drawing size of the dots in the at least one cell of the grid; and
    analyzing the initial size and the post-drawing size of the dots in the at least one cell of the grid to calculate the strains on a surface of the drawn part.

10. The method of claim 9 wherein the step of applying the dots to the blank is performed by spraying paint in a random pattern to the grid and cells.

11. The method of claim 9 wherein the step of recording the size and location of the dots is performed by photographing the blank and the step of measuring an initial size and location of the dots and the drawn size is performed by photographing the dots post-drawing.

12. The method of claim 11 wherein the step of comparing a change in an initial size of the dots in the to the size of the drawn dots is performed by comparing pixels of photographs of the initial size of the dots in the to the size of the drawn dots.

13. A method of measuring local strains in a sheet metal part comprising:
    selecting a sheet metal blank having a grid marked on a first side;
    marking the blank with a plurality of dots superimposed over the grid;
    recording an initial size and location of the dots relative to the grid;
    drawing the blank into a drawn part;
    measuring a post-drawing size of the dots in a selected portion of the grid; and
    analyzing the initial size and the post-drawing size of the dots in the grid to calculate the strains on a surface of the drawn part;
    applying a second set of dots to a surface of the drawn part, wherein the second set of dots are a different color than the dots applied to the surface of the blank;
    measuring the second set of dots in a pre-process condition and identifying the location of the second set of dots relative to the grid;
    performing a process on the drawn part;
    measuring the second set of dots in a selected portion of the grid in a post-process condition; and
    comparing a change in the size of the second set of dots in the pre-process condition to the size of the second set of dots in the post-process condition to determine an extent of stretching in localized areas of the drawn part that occurred during the step of performing a process.

14. The method of claim 13 wherein the step of performing a process is selected from a group of steps consisting essentially of:
    a re-striking operation;
    a trimming operation;
    a piercing operation;
    a flanging operation; and
    a hemming operation.

15. The method of claim 13 wherein the step of applying the dots to the blank and the step of applying the second set of dots to a formed part are performed by spraying paint in a random pattern to the grid and cells.

* * * * *